March 6, 1951     I. JEPSON     2,544,324
COFFEE MAKER SEAL
Filed Aug. 25, 1948
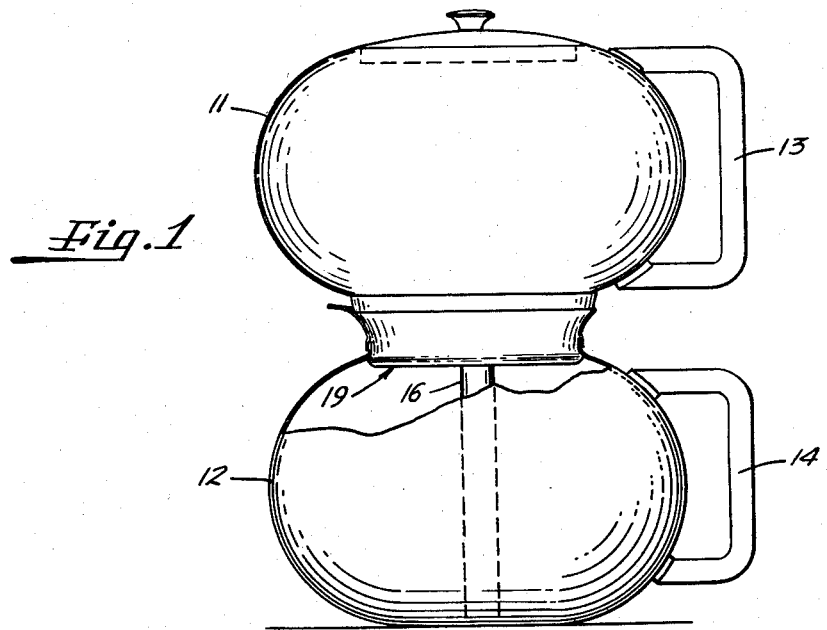
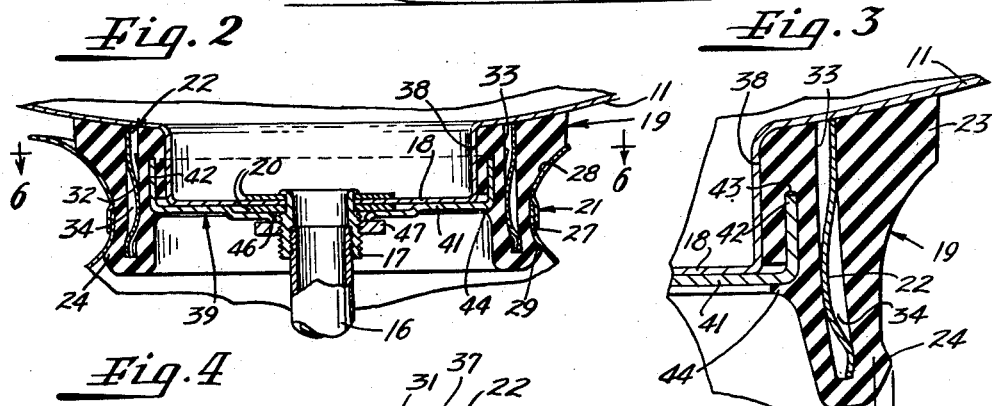
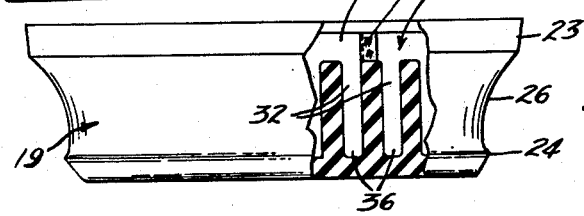
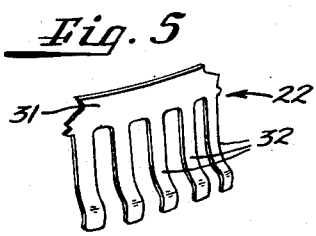
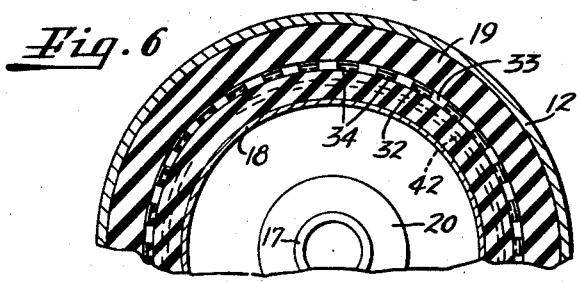
Inventor
Ivar Jepson
By McCanna & Morsbach
Attys.

Patented Mar. 6, 1951

2,544,324

UNITED STATES PATENT OFFICE 2,544,324

COFFEE MAKER SEAL

Ivar Jepson, Oak Park, Ill., assignor to Sunbeam Corporation, Chicago, Ill., a corporation of Illinois Application August 25, 1948, Serial No. 46,021

12 Claims. (Cl. 285—163)

1

This invention relates to coffeemakers and more particularly to a gasket utilized in effecting a seal between a removable upper vessel and a lower vessel of a coffeemaker wherein an internal pressure is developed in the lower vessel incident to the coffeemaking process.

Heretofore in coffeemakers of the above character a rubber gasket has been used to provide a separable seal between the upper and lower vessels. In some coffeemakers this gasket is intended to serve as the means for retaining the upper vessel in coaction with the lower vessel during the coffeemaking operation, and in others an additional fastening means is employed to hold or clamp the upper vessel in such position. Safety problems arise in both such cases and neither such gaskets nor such fastening means have been entirely satisfactory. For example, in order to insure a tight seal between the upper and lower vessels the diameter of the gaskets have been made larger than the diameter of the throat of the lower vessel so that when the upper vessel was seated in the lower vessel the gasket would be compressed to assure a seal. When soft grades of natural and synthetic rubber have been utilized in gasket material it has been found that after short periods of use these gaskets tend to permanently assume their deformed compressed shape and lose their resiliency. Obviously such gaskets cannot be relied upon to provide a seal between the upper and lower vessels. When the gaskets are made from harder rubber the gaskets are so uncompressible that it is difficult to seat the upper vessel on the lower vessel. In an effort to improve gaskets of the above character a reinforcing spring was incorporated in the gasket. The purpose of the spring was to counteract the compressive forces such as mentioned above so that the gasket always returned to its original position. While my present invention utilizes this feature, I have found that such feature is not an altogether satisfactory solution of the problem. In the first place it is difficult to position the top vessel in the lower vessel when the gasket is new due to the stiffness of the spring. Also, prior constructions of this type had certain unobvious defects which were inimical to satisfactory operation. And in certain prior constructions, after several thousand cycles of seating the top vessel in and removing it from the lower vessel, these gaskets lose their resiliency and consequently an effective seal between the respective vessels is not always assured.

Another objection to gaskets of the above character is the tendency of these gaskets to stick or bind in the throat portion of the lower vessel. This tendency is intensified where the gasket is not thoroughly cleaned. In the latter case the film of coffee in effect forms a cement between the gasket and side walls of the throat portion of the lower vessel which tends to cause the gasket to be adhered to the lower vessel. As a consequence it is difficult to remove the upper vessel. This binding or cementing is aggravated while removing the upper vessel from the lower vessel because the upper vessel is usually manipulated in a pivotal movement about the gasket which places the latter under still larger compressive forces.

An object of this invention is, therefore, to provide a gasket of novel construction which maintains its shape after repeated cycles of seating and removing the upper vessel from the lower vessel and which is relatively unaffected by temperatures or pressures encountered in coffeemakers.

Another object of the invention is to provide a gasket structure of the above character in which the outside diameter of the rubber portion of the gasket in its free state may be substantially the same as the inside diameter of the throat of the lower vessel and novel means is provided for expanding the gasket to obtain the desired sealing effect.

Another object of the invention is to provide an improved spring construction for reinforcing a gasket which is simple in construction, which is positive in its action and which is relatively inexpensive to manufacture.

Another object of the invention is to provide a gasket construction of the character described, in which the operator can tell by feel when the upper vessel is properly seated on the lower vessel.

Another object of the invention is to provide an improved gasket construction characterized by a novel mounting of the gasket on the upper vessel.

Another object of the invention is to provide a sealing gasket of novel construction combined in a novel relationship with the mounting of the gasket on the upper vessel, whereby to provide a most effective and durable sealing portion which is freely responsive to the tension of the reinforcing spring and is also responsive to the internal pressure in the lower vessel acting directly against said sealing portion to maintain an effective seal.

Other objects and advantages of the invention will become apparent from the following detailed description taken in connection with the accompanying drawings, in which—

Figure 1 is an elevational view with cutaway portions of a coffeemaker embodying the present invention;

Fig. 2 is an enlarged fragmentary view of the coffeemaker showing details of the construction of the gasket;

Fig. 3 is an enlarged fragmentary section through the gasket applied to the upper vessel;

Fig. 4 is a view of the gasket with a portion cutaway to expose the reinforcing spring construction;

Fig. 5 is a fragmentary perspective of the spring; and

Fig. 6 is a fragmentary sectional view taken substantially along the line 6—6 of Fig. 2.

Referring now to the drawings, the illustrative embodiment of the invention is shown in a coffeemaker of the so-called vacuum type in which the heated water is displaced from one vessel to another for infusion with the ground coffee. This embodiment includes an upper vessel 11 arranged to be seated on a lower vessel 12. For convenience in handling the upper vessel 11 is provided with a handle 13 and the lower vessel is provided with a handle 14. In utilizing the coffeemaker, coffee grind is placed on a filter, not shown, in the upper vessel 11 and water is disposed in the lower vessel. Heat is then applied to the lower vessel 12 by any suitable means. When the pressure builds up in the lower vessel, the water is forced from the lower vessel 12 into the upper vessel 11 through a tube 16 providing communication between the upper and lower vessels. The tube is threaded into a grommet 17 secured to the bottom of a depending portion 18 which may be rigid with respect to the upper vessel. Washers 20 are disposed on opposite sides of the bottom of the depending portion for reinforcement purposes. In flowing to the upper vessel the water passes through the abovementioned filter and leaches the coffee grind. In this process a vacuum is created in the lower vessel 12 upon cooling thereof and the coffee liquid is returned through the tube 16 to the lower vessel mainly by atmospheric pressure.

The invention is concerned with a novel gasket construction which positively effects a seal between the upper and lower vessels and permits the ready seating and the removal of the upper vessel 11 from the lower vessel 12 without the use of extraneous holding or clamping means. One of the features of this invention is that the gasket construction effectively maintains its predetermined shape and function. For this purpose my invention contemplates a novel gasket 19 having an outer periphery shaped to be disposed in a throat portion 21 of the lower vessel and a novel construction for a spring member 22 disposed in the gasket 19 to reinforce the latter and maintain its shape characteristics. As shown in the drawings the gasket 19 is in the form of an annular member preferably formed from Buna N type synthetic rubber. On its periphery the annular member is formed with spaced edge portions 23 and 24 interconnected by a smoothly curved central portion 26. In this embodiment the upper edge portion 23 seats against the upper vessel 11 and is of a diameter larger than the constricted portion 27 of the throat portion 21, as shown in Fig. 2. The gasket is also shaped to engage the upwardly curved surface 28 of the lower vessel 12 adjacent to the constricted portion 27 when the upper vessel 11 is seated on the lower vessel. The lower edge portion 24 forms an annular bead or projection shaped to engage the interior surface 29 of the lower vessel 12 at or adjacent to the constricted portion 27 and especially where this portion widens at its under side. The largest outside diameter of the annular bead is larger than the inside diameter of the constricted throat portion 27, and consequently is compressed to pass through the constricted portion 27 when the upper vessel is seated or removed. In its free state the diameter of the central portion 26 in the plane of the constricted portion 27 may be substantially the same as the diameter of the constricted portion. Preferably, the outer periphery of the gasket is treated to give it a certain hardness and smoothness which promotes greater life of the gasket and tends to prevent sticking and binding of the gasket with the lower vessel when the upper vessel is being seated or removed.

The improved spring member 22 comprises a ring or sleeve member 31 having a plurality of axially extending annularly spaced fingers 32. The ring is shaped to be disposed in an annular groove 33 extending inwardly from the top edge portion 23 of the gasket 19 and the fingers 32 are disposed in axially extending annularly spaced pockets or cavities 34 formed in the annular gasket member and spaced inwardly from the bead 24. The fingers 32 are shaped so that in the free state of the spring member 22 the fingers curve outwardly with respect to the annular ring portion so that the free ends 36 define an annular tension-imposing portion having a diameter larger than the annular ring portion. Thus when the spring member 22 is disposed in the gasket 19 the fingers 32 are stressed to assume the position shown in Fig. 2. The free ends 36 are disposed adjacent to the bead portion 24 of the gasket and exert a force outwardly on the gasket to expand this lower bead portion to an outside diameter greater than the normal condition of this portion of the gasket. Now, when the upper vessel is manipulated to seat it on the lower vessel, the expanded lower end of the gasket will be compressed against the outward tension of the spring fingers 32 by engagement with the constricted portion 27 of the throat in the lower vessel, until the bead or ridge portion 24 passes over such constricted portion 27. After passing through the constricted portion the fingers of the spring are sufficiently resilient and under such tension as to force the bead portion 24 into engagement with the inner surface 29 of the lower vessel 12. The gasket is of such size that resiliency of the rubber combines with the spring to effect this engagement and sealing action. The upper vessel thus is in effect snapped into position. This is advantageous since the user of the coffeemaker can readily determine by the feel of this engagement when the upper vessel 11 is properly seated. The spring may be of any suitable construction for the purpose described. In the preferred embodiment shown the spring member is stamped from a strip of flat spring material. In this case the ends of the stamping overlap and are spot welded as shown at 37 in Fig. 4 to form the ring portion 31. The fingers 32 are so spaced that in the stamping operation the material intermediate the fingers becomes the fingers for a second identical ring member at the opposite side of the strip. Thus two stampings can be made from a single strip and consequently there is no waste metal. In this embodiment the ring member is inserted into operative position in the gasket through the open end of the groove 33. Suitable spring means may, however, be inserted at the time of molding the gasket so as to be directly molded therein.

Novel means is provided for securing the gasket to the upper vessel 11. For this purpose the gasket is formed with a central opening 38 shaped to receive the depending portion 18 of the upper vessel 11 with a snug fit. The gasket 19 is supported by a retainer cup 39 in the form of a disc 41 having an annular upstanding flange 42 formed on its periphery and shaped to be received in an axially extending groove 43 formed in the gasket 19 between the central opening 38 and the spring groove 33. A lip 44 is formed on the gasket and engages the back of the disc 41. The retaining cup 39 is formed with a central opening 46 shaped to permit the passage of the threaded portion of the grommet 17. A nut 47 threaded on the grommet engages the disc 41 and when in tightened position as shown in Fig. 2 secures the gasket 19 to the upper vessel.

Attention is now directed to an important phase of my invention dealing with a novel relationship between the mounting of the gasket and the location of the resiliently displaceable lower portion of the gasket. This is best illustrated in Fig. 2 in which it will be observed that the gasket body is so mounted and retained on the lower vessel as to leave an annular resilient portion of substantial length depending beneath the retainer cup or plate 39. In this embodiment the lower vessel and the gasket are so shaped that the gasket seats or backs directly against the annular wall 38 and the adjacent under wall of the lower vessel 11. This annular wall 38 has a limited depth in relation to the overall vertical dimension of the gasket so that when the retainer cup or plate 39 is applied, the gasket has an annular depending portion of substantial length. It will be observed that the spring fingers 36 extend downwardly substantially to the lower end of this annular gasket portion and the tension of these spring fingers is freely active against this depending portion. Thus, while the spring means is firmly imbedded and mounted in the gasket in the upper portion thereof, the tension applying ends of the spring fingers are freely active in applying outward tension in the region of the bead or ridge 24. Thus when the upper vessel is applied to the lower vessel before starting the coffee making operation, the entering end of the gasket is displaced inwardly not only against the tension of the spring fingers 36 but also by bodily resilient displacement of said entering end. This makes for smooth and easy seating of the gasket to a full seated position and this ultimate position is definitely discernable by the feel because the bead or ridge portion 24 has a snap action upon engaging beyond the most constricted portion of the throat in the lower vessel. Similarly upon removing the upper vessel after the coffee has been made, the lower annular portion of the gasket is more freely and easily displaceable, particularly when the upper vessel is removed by applying pressure upwardly against the lower outer end of the handle 13 as by the thumb of the hand engaging the handle 14. With this construction the life of the rubber gasket in the lower retaining end portion thereof is not impaired as in constructions wherein this rubber body is confined between opposed walls and the resiliency occurs mainly in compressibility of the rubber. Another advantage of this construction is that when the parts are in the sealing position as shown in Fig. 2, the internal pressure developed in the lower vessel incident to the heating of the water, acts against the depending annular skirt portion of the gasket to further press this portion outwardly and hold the bead or ridge portion 24 seated beneath the constricted portion of the throat. This further promotes a better seal which will effectively hold the upper vessel in position during the coffee making operation without the use of extraneous holding or clamping devices.

From the foregoing it will be seen that the above construction is advantageous in providing an effective and satisfactory seal for coffeemakers of this type. Also, the user of the coffeemaker can readily determine by the snap effect of the spring construction when the upper vessel 11 is properly seated on the lower vessel 12. Moreover, the hardened exterior surface of the gasket insures that friction between the gasket and the lower vessel 12 is at a minimum. The gasket construction is positive in its action, is relatively inexpensive to manufacture; the construction does not substantially change its shape through use, and it is adapted for comparatively long life.

While I have shown one embodiment of my invention it will be understood that I do not wish to be limited thereto since many modifications may be made and I therefore contemplate by the claims to cover such modifications as fall within the true spirit and scope of my invention.

I claim:

1. In a coffeemaker of the class described, a lower vessel having a throat portion, an upper vessel, a gasket mounted to the upper vessel adapted to be seated in said throat portion to provide a seal between the vessels, said gasket comprising an annular body of resilient material open at its center and having a mounting portion adjacent to its top, means securing said mounting portion to the upper vessel, said gasket body having a lower annular portion extending substantially beneath the lower end of said mounting portion, and spring means within the body extending substantially into said annular lower portion of the body and normally stressed to radially expand said lower portion.

2. A gasket for a coffeemaker of the class described, comprising an annular body of resilient material open at its center and having a mounting portion adjacent to its top and center and terminating at a medial point between the top and bottom of the body so as to leave an outer annular body portion extending substantially beneath the lower end of the mounting portion, and reinforcing spring means within the body extending substantially into said annular lower portion of the body and stressed at all times to radially expand said lower portion.

3. A gasket for a coffeemaker of the class described comprising, a first sleeve portion formed from resilient material, a second sleeve portion formed from resilient material and in spaced relation to said first sleeve portion, said second portion being interconnected with said first sleeve portion at one end and extending axially at its opposite end substantially beyond said first sleeve portion, and means effective at all times for radially expanding said second sleeve portion at its said opposite end.

4. A gasket for a coffeemaker of the class described comprising, an annular body of resilient material having an inner portion shaped for mounting the body on a support and an outer portion in spaced relation to said inner portion and concentric therewith, said portions being interconnected at the top of the body and said outer portion terminating in a bead portion located below the lower end of said inner portion, and spring means disposed in said outer portion constantly stressed to radially expand said bead portion.

5. In a coffeemaker of the class described, a lower vessel having a throat portion, an upper vessel shaped to be seated on said lower vessel and having a depending portion, and a threaded tubular portion projecting downwardly from said depending portion into said lower vessel, in combination with a gasket comprising a spring reinforced resilient annular portion shaped to fit in said throat portion to form a seal between the upper and lower vessels when the former is seated on the latter, said annular portion having an opening shaped to receive said depending portion, said annular portion having an annular axially extending groove formed therein adjacent to said opening and concentric therewith, a disc having an opening through which the tubular portion extends and an annular upstanding flange shaped to be received in said groove, and a nut threaded on said tubular portion to abut against the disc to secure the gasket to the upper vessel.

6. A coffeemaker as set forth in claim 5, in which the annular gasket member extends substantially below the retaining cup and constitutes a radially resilient and displaceable sealing portion adapted to have sealing engagement in the throat portion of the lower vessel.

7. In a coffeemaker of the class described, a lower vessel having a throat portion, and an upper vessel arranged to be seated on the lower vessel and having a depending annular portion, in combination with a gasket comprising an annular member formed from resilient material and shaped to form a seal between the upper and lower vessels when the former is seated in the latter, said member having an annular opening shaped to receive said annular depending portion, said member having an annular axially extending groove formed thereon adjacent to said annular opening and concentric therewith, a disc having an annular upstanding flange shaped to be received in said groove to secure the disc and annular member together, and means for securing the disc to the upper vessel to position the annular member.

8. In a coffeemaker of the class described, a lower vessel having a throat portion, and an upper vessel arranged to be seated on the lower vessel and having a depending annular portion, in combination with a gasket comprising a resilient annular member shaped to fit in said throat portion to form a seal between the upper and lower vessels when the former is seated on the latter, said member having an annular opening shaped to receive said annular depending portion, said member having an annular groove formed thereon adjacent to said annular opening and concentric therewith, a retaining cup having an outer peripheral upstanding edge shaped to be received in said groove, and means for securing the retaining cup to the upper vessel whereby the annular member is securely fastened thereto.

9. In a gasket for a coffeemaker of the class described, a spring member comprising a ring portion and a plurality of annularly spaced fingers, said fingers projecting axially of said ring, and being preshaped such that the free ends of said fingers define an annular portion having a larger diameter than said ring portion.

10. In a coffeemaker of the class described, a first vessel having a throat portion, and a second vessel having a depending portion of smaller diameter than said throat portion, in combination with a gasket mounted on one of the vessels and shaped to be disposed between the first and second vessels comprising an annular member formed from resilient material and having an opening shaped to receive said depending portion of the second vessel, said annular member having spaced upper and lower end portions and a central portion interconnecting said end portions, said upper end portion shaped to abut against the second vessel adjacent to the depending portion and having a diameter larger than the constricted portion of the throat portion of the first vessel, said lower end portion also having a diameter larger than the constricted portion and forming a bead on the periphery of the annular member shaped to engage the interior surface of the first vessel adjacent to the constricted portion when the second vessel is seated on the first vessel, said central portion in the plane of the constricted portion of the throat portion having a diameter substantially the same as that of the constricted portion to form a seal between the respective vessels when the second vessel is seated on the first vessel, said annular member having a plurality of annularly spaced axially extending pockets formed therein and an annular groove in communication with said pockets and opening on the top face of the annular member, and a spring member comprising a ring portion shaped to be disposed in said annular groove and having a plurality of integral generally axially extending fingers shaped to fit in said pockets, the end portions of the fingers normally being disposed within the lower end portion of the gasket and outwardly from the ring portion whereby when said spring member reinforces said annular member said ends are compressed to place said annular member under a slight tensile strain tending to radially expand said lower end portion of the gasket.

11. In a coffeemaker of the class described, a first vessel having a throat portion, and a second vessel having a depending portion of smaller diameter than said throat portion, in combination with a gasket mounted on one of the vessels and shaped to be disposed between the first and second vessels comprising an annular resilient member having an opening shaped to receive said depending portion of the second vessel, said annular member having spaced end portions interconnected by a central portion, said central portion having a smooth external peripheral surface shaped to conform to the throat portion of the lower vessel, one of said end portions forming a bead, said annular member having a plurality of annularly spaced axially extending pockets formed therein and an annular groove in communication with said pockets, a spring member comprising a ring portion shaped to be disposed in the annular groove and having a plurality of preshaped fingers disposed in said pockets, said fingers being continually inherently stressed to maintain said bead portion of the ring in a predetermined position, said bead portion and fingers being compressible during the inserting of the upper vessel in and the withdrawal thereof from the lower vessel.

12. In a coffeemaker of the class described, a first vessel having a throat portion, and a second vessel shaped to be seated on said first vessel, in combination with a gasket mounted to one of the vessels and shaped to be disposed between the first and second vessels, comprising an annular spring reinforced resilient member having spaced end portions and a central portion of reduced diameter interconnecting said end portions, one of said end portions shaped to abut against the second vessel in its mounting thereon and having a diameter larger than the constricted portion of the throat portion of the first vessel, said other end portion also having a diameter larger than the constricted portion and forming a bead on the periphery of the annular member shaped to engage the interior surface of the first vessel adjacent to and beneath the constricted portion when the second vessel is seated on the first vessel, and said other end portion being located axially beneath the said mounting of the gasket on said one vessel.

IVAR JEPSON.

REFERENCES CITED

The following references are of record in the file of this patent:

UNITED STATES PATENTS

| Number | Name | Date |
|---|---|---|
| 1,963,465 | Johnson | June 19, 1934 |
| 2,100,487 | Marsden | Nov. 30, 1937 |
| 2,223,450 | Jepson | Dec. 3, 1940 |